INVENTOR
CLIFFORD A. BICKEL
BY
Toulmin & Toulmin
ATTORNEYS

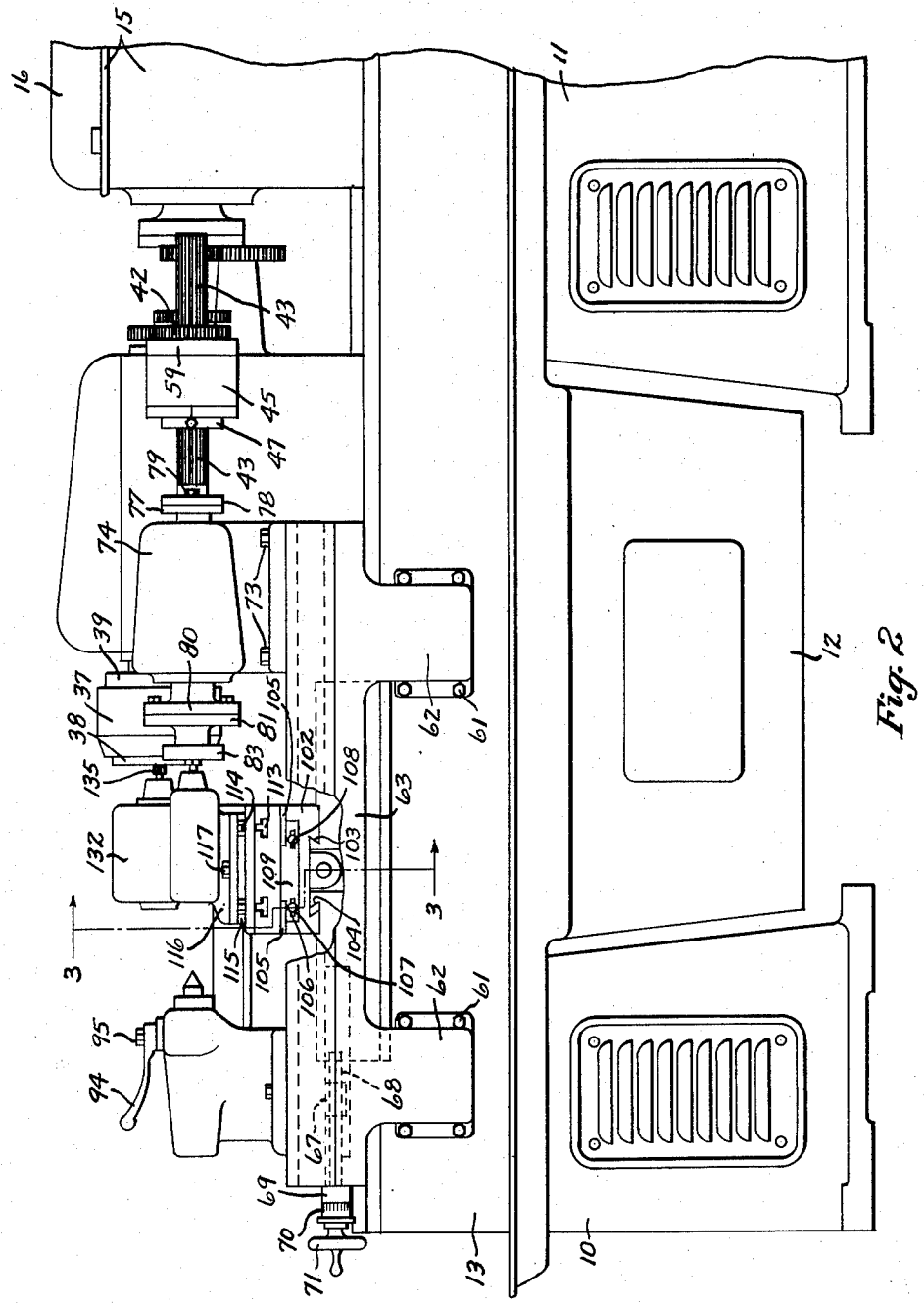

Jan. 10, 1939.　　C. A. BICKEL　　2,143,258
CAM MAKING MACHINE
Filed Sept. 30, 1936　　3 Sheets-Sheet 3
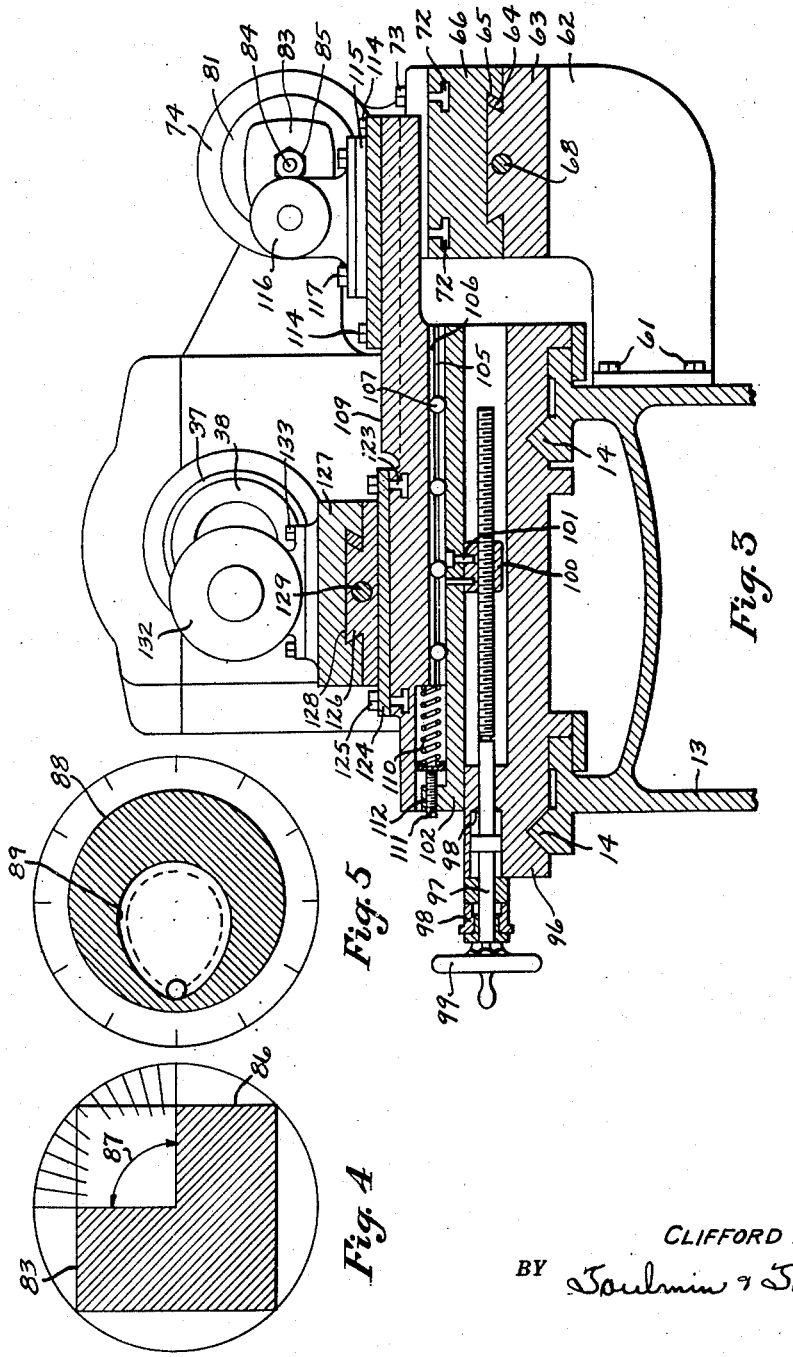
INVENTOR
CLIFFORD A. BICKEL
BY Toulmin & Toulmin
ATTORNEYS Patented Jan. 10, 1939

2,143,258

UNITED STATES PATENT OFFICE 2,143,258

CAM MAKING MACHINE

Clifford A. Bickel, Sidney, Ohio, assignor to The Monarch Machine Tool Company, Sidney, Ohio, a corporation of Ohio Application September 30, 1936, Serial No. 103,406

7 Claims. (Cl. 90—13.7)

This invention relates to machine tools, and in particular, to machinery for making cams, patterns or templates with the aid of a pattern or template used as a standard.

One object of this invention is to provide a cam-making machine for machining cams, templates or profile devices from a standard pattern, cam or template.

Another object is to provide a machine for machining cams, patterns or templates which are developed into 360 degrees or a complete revolution from a portion of a standard pattern, this portion being but a fractional part of a revolution.

Another object is to provide a cam-making machine wherein the cam being machined is revolved at a different speed from the standard pattern or cam being followed so that a portion only of the standard cam or pattern is developed into a complete revolution of the cam being machined, the speed ratios of the standard pattern and the cam being machined being suitably adjusted for this purpose.

Another object is to provide such a machine as an attachment for mounting upon a standard engine lathe so that such an engine lathe may be adapted to produce cams from standard patterns, templates or profile devices.

In the drawings:

Figure 2 is a rear elevation of the machine shown in Figure 1.

Figure 3 is a vertical cross section taken along the line 3—3 of Figure 2.

Figure 4 is a view of a standard cam, pattern or profile device from which the cam is to be machined.

Figure 5 is a view of the completed cam produced from the cam pattern or template of Figure 4 by the aid of the present invention.

Figure 1:
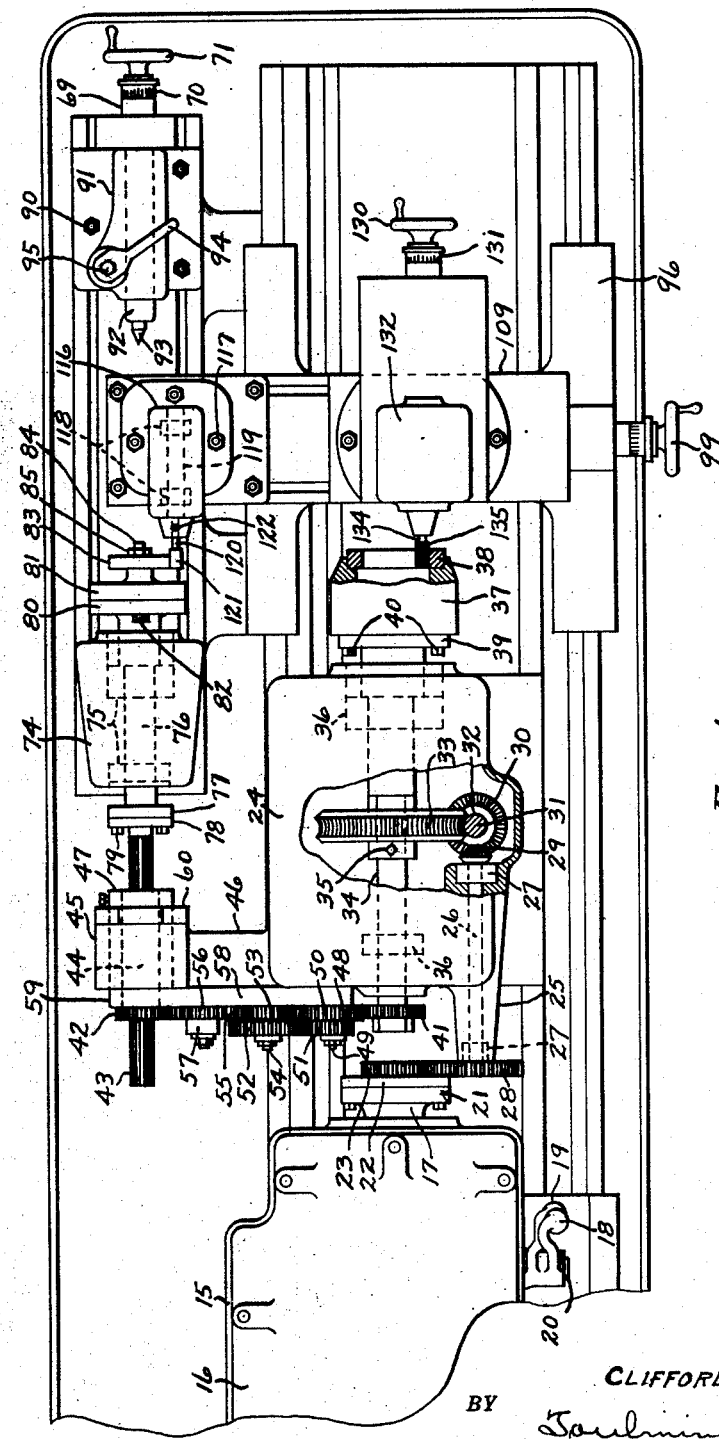
Figure 1 is a top plan view of the cam-making machine of this invention, with portions thereof broken away to disclose the driving connections and structure more clearly.

In general, the cam-making machine of this invention consists of a pair of shafts which are interconnected by change speed gearing so as to be capable of relative rotation at different predetermined speeds. A standard pattern, cam or profile device is mounted upon one shaft, and the blank from which the desired cam is to be made is mounted upon the other shaft. A slide is provided for reciprocatory movement transversely to the axes of the two shafts, this slide being mounted upon ball bearings in grooved guideways. Upon one end of this slide is mounted a pattern follower, whereas upon the other end is mounted a cutting tool with a suitable driving arrangement. Accordingly, when both shafts are revolved and the pattern follower is urged into engagement with the standard pattern, this motion is transmitted to the slide, which reciprocates in response to the configuration of the pattern. This reciprocation is transmitted to the cutting tool, which reproduces a profile upon the cam blank. This profile will be related to but not identical with the configuration of the standard pattern when the two shafts are rotated at different speeds so that a fractional portion only of a revolution of the standard pattern will be developed into a complete revolution of the cam being machined. The cams thus machined are suitable for use with the machine shown in the copending application of Bickel et al., Ser. No. 97,959, filed August 26, 1936, for a lathe.

Referring to the drawings in detail, Figures 1 and 2 show a machine, such as an engine lathe, having pedestals 10 and 11 with a pan 12 extending between them and a bed 13 supported by these pedestals. The bed 13 is provided with ribbed ways 14, upon which are mounted a main head stock 15 and its cover plate 16. The pedestal 11 contains a suitable motor (not shown) for operating mechanism within the main head stock 15, by which rotation is imparted to the main spindle 17. This head stock mechanism in itself forms no part of the present invention, and may be of any suitable type employed in standard engine lathes for varying the speeds of the main spindle. Hand levers 18 and 19 are provided upon a shaft 20 for controlling the various speed settings of the mechanism within the main head stock 15. Mounted upon the main spindle 17 is a spindle head 21 having a plate 22 secured thereto. Upon the plate 22 is mounted a gear 23 by which the mechanism of the cam-making machine is driven from the main spindle 17.

Mounted upon the bed 13 of the machine is a sub-head stock 24 (Figure 1) having an extension or boss 25. Within this boss and the portion of the sub-head stock 24 adjacent thereto is rotatably supported a shaft 26 with the aid of the anti-friction bearings 27. Upon one end of this shaft is mounted a gear 28 meshing with the gear 23 upon the main spindle head plate 22. Upon the other end of the shaft 26 is mounted a bevel pinion 29 adapted to mesh with and drive a bevel gear 30 upon the worm shaft 31. The worm shaft 31 is mounted, in a vertical position, in anti-friction bearings (not shown) and carries a worm 32 meshing with and driving a worm gear 33 secured to the work spindle 34, as by the set screw 35 on the hub thereof. The work spindle 34 is rotatably supported in anti-friction bearings 36 mounted in the sub-head stock 24, and carries at one end a chuck 37 adapted to receive and hold the cam blank 38 which is to be machined into the desired cam. The chuck 37 is secured to the work spindle head 39 by the bolts 40. It will be understood, however, that the chuck 37 is merely shown as one form of holding the cam blank 38, it being obvious that the cam blank 38 may be held in other suitable manners, such as by being bolted to a face plate, or held magnetically.

Secured to the opposite end of the work spindle 34 from the chuck 37 is a gear 41 which drives, through a gear train, a gear 42 mounted for relative longitudinal motion upon the splined auxiliary drive shaft 43. The gear 42 is mounted upon a sleeve 44 passing through the journal portion 45, the latter being located at the end of an arm 46 extending outwardly from the sub-head stock 24 (Figure 1). A collar 47 retains the gear 42 and the sleeve 44 in position within the journal portion 45. The gear train by which the gear 42 is driven from the gear 41 consists of the double gear 48 mounted upon the stud 49, and having gear portions 50 and 51. The gear portion 50 meshes with the gear 41, whereas the gear portion 51 meshes with the gear portion 52 of the double gear 53, mounted upon the stud 54. The double gear 53 also has a gear portion 55 meshing with the gear 56 upon the stud 57. The gear 56, in turn, meshes with and drives the gear 42 upon the auxiliary head stock drive shaft 43. The gear train, consisting of the double gears 48 and 53 and the single gear 56, comprises a change speed gearing assembly mounted upon a quadrant 58. The quadrant 58 terminates in a sleeve-like portion 59 surrounding the sleeve 44, and similarly held in position by the collar 60.

The gear train arranged between the gears 41 and 42 on the quadrant 58 is composed of gears which may be interchanged in such a manner as to enable the relative speeds between the spindles 34 and 43 to be varied and adjusted to any desired ratio. Ordinarily, these gears will be so chosen that the shaft 43 will revolve a predetermined number of revolutions for every revolution of the work spindle 34. For example, in developing the cam shown in Figure 5 from a pattern of square cross section, as shown in Figure 4, the change speed gears on the quadrant 58 will be so chosen as to rotate the work spindle 34 four times for every revolution of the auxiliary spindle because one quarter of the standard pattern is developed into a full revolution of the cam made therefrom.

Secured to the lathe bed 13, as by the bolts 61, is the two-armed angle bracket 62 having a horizontal portion 63 provided with a dove-tail ridge 64. Cooperating with this ridge is a dove-tail groove 65 in a sliding suport 66 (Figure 3). The sliding support 66 is provided with a nut 67 (Figure 2), which engages the threads of a screw shaft 68 which is journaled near its outer end, as at 69, in the bracket portion 63. Secured to the outer end of the screw shaft 68 is a micrometer dial 70 and a hand wheel 71. By rotating the hand wheel the sliding support 66 may be moved longitudinally through the engagement of its nut 67 with the screw shaft 68, the amount of motion being determinable from the micrometer dial 70. The sliding support 66 is provided with T-grooves 72, which serve adjustably to receive the T-bolts 73, securing thereto the auxiliary head stock 74. Journaled within the auxiliary head stock 74, as by the anti-friction bearings 75 (Figure 1), is the auxiliary head stock spindle 76. The auxiliary head stock spindle 76 and the auxiliary drive shaft 43 are provided with coupling flanges 77 and 78, respectively, these being united by the bolts 79.

Mounted on the opposite end of the auxiliary head stock spindle 76 from the coupling flange 77 is the auxiliary spindle head 80, to which is secured the pattern support 81, as by the bolts 82. Mounted upon the pattern support 81 is the standard pattern 83, this being arranged upon the threaded stud 84 and secured in position by the nut 85 (Figure 1). The standard pattern or template 83 is shown in Figure 3 as consisting of a roughly square object with curved instead of flat sides. It will be understood, however, that this pattern 83 may be of any desired contour, depending upon the nature of the work-piece which it is desired to turn as a result of the cam to be produced by the machine of the present invention.

In Figure 4 the pattern or template 83 is shown as consisting of a square plate having flat sides 86, a quarter portion 87 of which is developed to form the cam 88 shown in Figure 4 as produced from the cam blank 38. The cam 88 is thus an internal cam, whereas the template or pattern 83 serves as an external cam. The pattern 83, in the particular case of a machine for turning work-pieces of square cross section, is formed to represent a typical cross section of such a work-piece. The internal cam surface 89 of the finished cam 88 thus represents a quarter portion of the template or pattern 83 developed into 360 degrees or a complete revolution. Also mounted upon the sliding support 66 and secured by the T-bolts 90 to the T-slots 72 thereof, is the tail stock 91. This tail stock is used when it is desired to employ templates or patterns supported between centers. In the set-up shown in Figure 1, where the cam pattern 83 is secured to the pattern support 81, the tail stock 91 is temporarily out of use. The tail stock 91 is provided with a spindle 92 having a so-called dead center 93. The spindle 92 is movable in and out as well as clamped by the handle 94 secured to the end of the shaft 95 (Figure 1).

Mounted for reciprocation longitudinally along the guideways 14 of the lathe bed 13 is the carriage 96. This carriage is provided with a cross feed screw 97 (Figure 3), journaled as at 98, in the carriage 96 and having a micrometer dial 98 and a hand wheel 99 on the outer end thereof. The cross feed screw 97 and the carriage 96 may be those of a standard engine lathe, in which event the cross feed screw 97 is, of course, adapted to be power-driven by the usual mechanism provided for that purpose. For the sake of clearness and simplicity, however, this driving mechanism is not shown in Figure 3, because it is not employed in the present machine. The cross feed screw 97 in the present machine is rotated manually by means of the hand wheel 99, the amount of linear motion imparted to the nut 100 thereon being indicated by the micrometer dial 98. The nut 100 is secured, as by the screws 101 (Figure 3), to the transverse slide 102. The latter is provided with a dove-tail groove 103 cooperating with a dove-tail ridge 104 to provide guidance for the transverse slide 102 as it is moved to and fro by the action of the hand wheel 99 and the cross feed screw 97.

The transverse slide 102 is provided with members 105 of hardened steel having grooves 106 adapted to receive the bearing balls 107, the opposite portions of which engage grooves 108 in the cam cutter slide 109. A spring 110 (Figure 3) is provided to urge the cam cutter slide 109 rearwardly, and an adjustment is provided by the adjusting screw 111 mounted in the threaded hole 112 in the transverse slide 102. By rotating the adjusting screw 111 the force exerted by the spring 110 may be varied, as desired. The cam cutter slide 109 is provided with T-slots 113 extending lengthwise thereof. Mounted upon the cam cutter slide 109 and secured to these slots by means of the T-bolts 114, is the swivel 115 to which the swivel housing 116 is secured, as by the bolts 117. Mounted in anti-friction bearings 118 on the swivel housing 116 is the cam follower sleeve 119, holding the follower shaft 120 which terminates in the follower 121. The follower 121 engages the pattern or template 83 and is urged thereagainst by the action of the spring 110. The follower shaft 120 is secured to the sleeve 119 by means of the set screw 122 on the end thereof (Figure 1).

Mounted on the forward end of the cam cutter slide 109 and secured in the transverse T-slots 123 thereof is the cam cutter swivel 124, the position being varied by tightening or loosening the T-bolts 125 (Figure 3). The cam cutter swivel 124 is provided with a dove-tail ridge portion 126 which cooperates with the cutting motor slide 127, having a corresponding dove-tail groove 128. A screw shaft 129 engages a nut (not shown) on the cutting motor slide 127 and is actuated manually by the hand wheel 130 (Figure 1) to move the slide 127 to and fro, the amount of motion being indicated by the micrometer dial 131. The cutting motor slide 127 serves to support the cutting motor 132, which is secured thereto by the bolts 133. The cutting motor 132 is provided with a motor shaft 134, upon the end of which is mounted a cutter 135. The cutter 135 may be of any suitable type, a milling cutter being found useful in many instances.

Operation

In the operation of the machine of the present invention, the standard pattern 83 is first made in any suitable manner, such as manually. This pattern 83 is so chosen as to reproduce a typical cross section of the work-piece which is subsequently to be turned upon a lathe for turning irregular work-pieces, such as that shown in the copending application of Bickel et al., Ser. No. 97,959, filed August 26, 1936. This pattern 83 is then mounted upon the pattern support 81, in the manner previously described, and the gears of the gear train on the quadrant 58 so chosen as to provide the necessary multiple number of revolutions of the shaft 43 with respect to the work spindle 34. In the example shown in Figures 4 and 5, where a cam is to be made developing a quarter portion of a work-piece of square cross section, the gear is so chosen as to cause the work spindle 34 to rotate four times to every revolution of the auxiliary spindle 76. The cam blank 38 (Figure 1) is then mounted in the chuck 37 and the auxiliary head stock 74 suitably positioned by turning the hand wheel 71. The follower 121 is then brought into engagement with the periphery of the standard pattern 83, and the cutter 135 adjusted to occupy the proper position with respect to the cam blank 38 by turning either the hand wheel 130 or the hand wheel 99.

The main driving motor of the machine is then started in operation to rotate the main spindle 17, and the cutting motor 132 is started. The standard pattern 83 then rotates about the axis of the auxiliary spindle 76, causing the follower 121 and hence the cam cutter slide 109 to reciprocate in conformity with the peripheral contour. This motion is transmitted to the cutter 135, which proceeds to cut a surface of related profile upon the internal portion of the cam blank 38. This surface will not ordinarily correspond to the periphery of the standard pattern 83, as shown by a comparison of Figures 4 and 5, because of the difference in the speeds of rotation of the work spindle 34 and auxiliary head stock spindle 76. In this manner the cutter 135 is caused evenly to produce the cam 88 with the internal cam surface 89 from the cam blank 38. The cam surface 89 is therefore a development in a complete revolution of the partial revolution 87 of the standard pattern 83.

As shown in the embodiment disclosed in the present drawings, the machine of this invention is illustrated as an attachment which may be made to a standard engine lathe. In this manner a standard engine lathe may be converted into a machine for machining such cams. It will be understood, however, that the work spindle shaft 34 may be driven at the proper speed, and the assembly shown in Figure 1 arranged as a separate machine rather than as an attachment for a standard engine lathe. The showing of the attachment has been made merely for convenience, but the machine itself is independent of the necessity for attachment to or use with an engine lathe.

It will be understood that I desire to comprehend within this invention such modifications as come within the scope of the claims and the invention.

Having thus fully described my invention, what I claim as new and desire to secure by Letters Patent, is:

1. In a cam-making machine, means for rotatably supporting a work-piece and a pattern, means for rotating said workpiece and said pattern in synchronism, an external follower for engaging and following the exterior of said pattern, an internal cutter for engaging and for cutting the interior of said work-piece to the same configuration as the exterior of said pattern, a transverse freely movable slide for supporting and interconnecting said follower and said cutter for moving said cutter in response to the configuration of said pattern, said cutter having its axis arranged parallel with the axis of said follower whereby the thrust of the rotating pattern upon the follower will cause the cutter to engage the workpiece on the interior thereof, and means for rotating said cutter.

2. In a cam-making machine, means for rotatably supporting a work-piece and a pattern, means for rotating said workpiece and said pattern in synchronism, an external follower for engaging and following the exterior of said pattern, an internal cutter for engaging and cutting the interior of said work-piece to the same configuration as the exterior of said pattern, a transverse freely movable slide having said follower and said cutter rigidly mounted thereon, said external follower being arranged not only to move said cutter in response to the configuration of said pattern but also to hold said cutter in cutting engagement with the interior of the workpiece, and means for rotating said cutter.

3. In a cam-making machine, a work-piece-supporting element, a pattern-supporting element, a pattern associated with said pattern-supporting element, a follower for engaging said pattern, a rotatable cutter for engaging said work-piece, means for rotating said cutter, a slide for supporting and interconnecting said follower and said cutter, a carrier for supporting said slide for reciprocation relatively thereto, means for rotating said work-piece-supporting element, and change speed devices operatively interconnecting said rotating means and said pattern-supporting element for rotating said pattern at a different speed relatively to said work-piece.

4. In a cam-making machine, a work-piece-supporting element, a pattern-supporting element, a pattern associated with said pattern-supporting element, a follower for engaging said pattern, a rotatable cutter for engaging said work-piece, means for rotating said cutter, a slide for supporting and interconnecting said follower and said cutter, a carrier for supporting said slide for reciprocation relatively thereto, means for rotating one of said elements, and change speed devices operatively interconnecting said rotating means and said other element for rotating said other element at a different relative speed.

5. In a cam-making machine, a work-piece-supporting element, a pattern-supporting element, a pattern associated with said pattern-supporting element, a follower for engaging said pattern, a rotatable cutter for engaging said work-piece, means for rotating said cutter, a slide for supporting and interconnecting said follower and said cutter, means for rotating one of said elements, change speed devices operatively interconnecting said rotating means and said other element for rotating said other element at a different relative speed, a carrier for supporting said slide for motion relatively thereto, and anti-friction bearing elements arranged between said slide and said carrier.

6. In a cam-making machine, a work-piece-supporting element, a pattern-supporting element, a pattern associated with said pattern-supporting element, a follower for engaging said pattern, a rotatable cutter for engaging said work-piece, means for rotating said cutter, a slide for supporting and interconnecting said follower and said cutter, a carrier for supporting said slide for reciprocation relatively thereto, means for rotating one of said elements, change speed devices operatively interconnecting said rotating means and said other element for rotating said other element at a different relative speed, guideways arranged between said slide and said carrier, and anti-friction ball bearings arranged to move in said guideways while engaging and spacing said slide and said carrier.

7. In a cam-making machine, a work-piece-supporting element, a pattern-supporting element, a pattern associated with said pattern-supporting element, a follower for engaging said pattern, a rotatable cutter for engaging said work-piece, means for rotating said cutter, a slide for supporting and interconnecting said follower and said cutter, a carrier for supporting said slide for reciprocation relatively thereto, means for rotating said work-piece-supporting element, change speed devices operatively interconnecting said rotating means and said pattern-supporting element for rotating said pattern at a different speed relatively to said work-piece, and means for adjustably varying the relative positions of said cutter and said follower on said slide.

CLIFFORD A. BICKEL.